April 27, 1965     M. E. MOLONEY     3,181,111
ELECTRICAL CONNECTOR
Filed Dec. 12, 1962
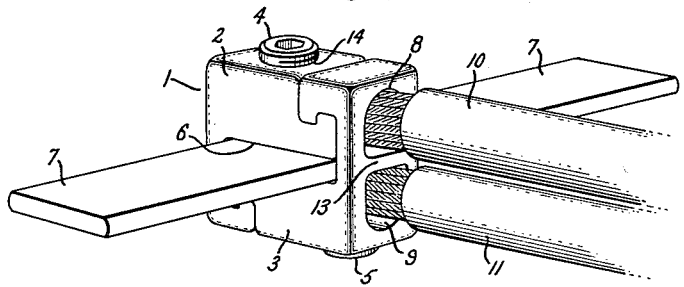
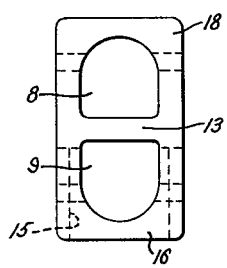
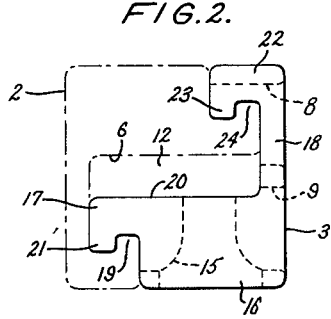
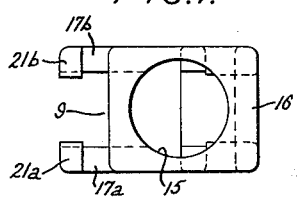
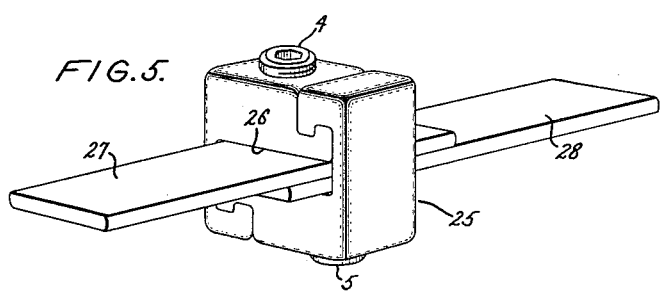
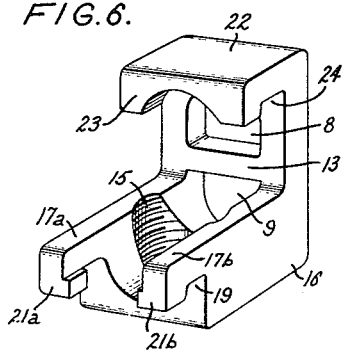
INVENTOR:
MARK E. MOLONEY,
BY Irving H. Marshman
ATTORNEY.

United States Patent Office 3,181,111
Patented Apr. 27, 1965

3,181,111
ELECTRICAL CONNECTOR
Mark E. Moloney, Peterborough, Ontario, Canada, assignor to Canadian General Electric Company, Limited, Toronto, Ontario, Canada, a corporation of Canada
Filed Dec. 12, 1962, Ser. No. 244,210
2 Claims. (Cl. 339—244)

This invention relates to a connector for connecting lead-off conductors to a bus bar.

There are many applications in the use of electrical energy where bus bars serve as power supply mains and lead-off conductors (e.g., insulated cables) from the bars serve as feeders for transmitting power from the bus bars to the electrical equipment. Metal enclosures for the equipment used to control dynamoelectric machines (e.g., motor control centers) exemplify applications where bus bars are used extensively as power mains. As those familiar with the art well know, generally, enclosures of this type contain a large amount of electrical equipment which is crowded into very limited space, and as a result, there is little space left inside the enclosure for the workman who installs or services the equipment.

In the past, it has been common practice to supply bus bars containing a series of bolt holes spaced along the length of the bar for use in connecting lead-off conductors such as insulated cables to the bars. These holes may either receive through bolts or be tapped to receive cap screws. In the event that the connection of a lead-off conductor could not conveniently be made at one or more of the holes provided, it was necessary to machine new holes in the bus bar in the required locations. Because this machining operation had to be performed during installation of the equipment, modification or maintenance thereof, i.e., with the bus bars assembled within the enclosure, the operation was both difficult and time consuming. In certain instances it has been considered desirable to supply equipment where the bus bars contained no preformed bolt holes, in which case all of the bolt holes had to be drilled and tapped during installation of the equipment. Apart from the cost of providing bolt holes in bus bars, whether during manufacture of the bars or during installation of the equipment, such holes result in the removal of metal from the bars. Even though the presence of holes in an electrical conductor may not be always objectionable, the presence of such holes is considered to be undesirable and to be avoided if possible because the formation of holes involves removal of metal from the conductor thereby reducing its cross-section with possible loss of electrical conductivity.

Connectors which clamp onto a bus bar are well known in the art and have proven to be very satisfactory for many applications. However, in enclosed equipment such as that referred to above, clamp-in connectors appear not to have been entirely satisfactory because the bolt on practice has been continued in spite of its obvious disadvantages. Although satisfactory in certain respects, prior art clamp-on connectors have been unsatisfactory in other respects for one or more of the following reasons: failure to provide sufficiently low resistance, especially after a substantial duration of use; too large and bulky; if small enough for convenience of installation, too weak mechanically; too difficult to install where space is limited; failure to provide a connection which will not loosen from repeated heating and cooling of the connector; cost too high; etc.

I have provided a clamp-on type of connector which is relatively small and compact, which is readily installed on a bus bar even where space is limited and thereafter moved along the bar to any point desired, which makes and maintains a relatively low resistance connection between a bus bar and a lead-off conductor, and which requires no bolt holes in the bus bar or other machining thereof.

Essentially, my novel connector comprises a hollow block formed from two similar segments adapted to be assembled in interlocking relation around a bus bar and secured thereto by means of one or two set screws which also secure lead-off conductors to the bus bar. A first slot for the bus bar extends through the block in one direction and two other slots for lead-off conductors extend through the block on opposite sides of the bus bar slot at approximately a right angle to said one direction whereby the three slots define a hollow inside the block. Each segment contains a threaded passage for a set screw, which passage terminates in the hollow and is approximately at a right angle with respect to the slots. Each set screw serves a three-fold purpose in that it secures lead-off conductors in direct contact with the bus bar, and secures the two segments together as well as to the bus bar. The block can be secured properly to a bus bar by means of one set screw only, in which case only one of the conductor slots can be used for the lead-off conductors. A block having two of said other slots is preferred because the two segments can then be identical, thus making it possible to manufacture both segments with the same tools. Since it is unnecessary to provide any bolt holes in the bus bar and no special securing means for the connector needs to be formed on the bus bar, there is no loss of bus bar conductivity, and the connector can be secured at any desired point on the bus bar.

It is possible also to use the connector to secure the overlapping ends of two or more bus bars with or without provisions being made for lead-off conductors. In the event that the lead-off conductors are limited to what one conductor receiving slot will take, the other slot can be eliminated. Or if no lead-off conductors are required, both conductor slots can be eliminated.

In the accompanying drawings, FIGURE 1 is a view in perspective showing the novel connector connecting two lead-off cables to a bus bar;

FIGURES 2, 3 and 4 are views of one segment of the connector in elevation, plan and profile respectively;

FIGURE 5 is a view in perspective of the connector securing two bus bars together; and FIGURE 6 is a view in perspective of a single segment of the connector.

In accordance with the embodiment shown in FIGURES 1 to 4, the connector comprises a block 1 divided into two identical interlocked segments 2 and 3 and a pair of set screws 4 and 5. The block has a first slot 6 extending through it in one direction for bus bar 7 and two other slots 8 and 9 for lead-off conductors 10 and 11 extending through the block on opposite sides of slot 6 and in a direction substantially at a right angle with respect to the direction of slot 6. Slots 8 and 9 are parallel and overlap slot 6 inside the block thereby defining a hollow 12 inside the block. Segment 2 contains a threaded passage 14 for set screw 4 and segment 3 contains a similar threaded passage 15 for set screw 5. These two passages are substantially parallel, offset in the direction of slots 8 and 9 and substantially perpendicular to slots 8, 9 and 6. Passage 14 extends from the outer surface of segment 2 into slot 8 and passage 15 extends from the outer surface of segment 3 into slot 9; therefore, both passages terminate in hollow 12 at slot 6. Slots 6, 8 and 9 define a rib 13 in each segment, which ribs reinforce the hollow block against forces exerted thereon by the clamping action of the set screws.

As stated in the foregoing paragraph, it is preferable to have both segments identical because then they can be made with the same shop tools. I have found that segments cast from relatively strong metal such as a silicon bronze by means of a process such as a lost wax process are very satisfactory and require little or no finish machining except for tapping passages 14 and 15. FIGURES 2, 3 and 4 show three views of one segment in orthographic projection, namely, segment 3. The segment consists of a body portion 16 formed with integral first and second extensions 17 and 18 respectively projecting from opposite ends of the body portion. First extension 17 is a relatively narrow and short continuation of one end of the body portion along the edge 20 thereof, and it terminates in a portion 21 offset in a direction pointing away from edge 20 whereby offset portion 21 and both portion 16 define a first recess 19. Because slot 9 passes through body portion 16 and extension 17 in a direction parallel to edge 20 thereof, it divides the extension and offset portion into two separate extensions 17a, 17b and offset portions 21a, 21b respectively as clearly shown in FIGURE 4. Moreover, slot 9 interrupts the continuity of recess 19. Second extension 18 is a relatively narrow and long continuation of the other end of body portion 16, it projects therefrom at approximately a right angle to edge 20, and it terminates in a hooked portion which defines a second recess 24. An intermediate portion 22 of the hooked portion projects from extension 18 in the same direction as body portion 16, and it terminates in end portion 23 which projects towards the body portion. Slot 8 passes through extension 18 as shown in FIGURE 3, recess 24, and it divides end portion 23 in two. Threaded passage 15 in body portion 16 extends from the outer surface thereof remote from surface 20 into slot 9.

In brief, the body portion of each segment includes a pair of hooks which are located on opposite sides of the bus bar slot. These hooks together with bus bar slot 6 constitute the line of division which separates block 1 into segments 2 and 3. The first hook is a short extension of one end of the body portion of which the opening or mouth is spaced from and faces away from one side of the bus bar slot. The second hook is on the end of a relatively long, substantially right angular extension of the other end of the body portion, which extension reaches to the other side of the bus bar slot and terminates there in a second hook which has its opening or mouth spaced from and facing towards the other side of the bus bar slot. When the segments are assembled, the first and second hooks of one segment interlock with the second and first hooks respectively of the other segment.

To fit connector 1 to bus bar 7, segments 2 and 3 are placed on opposite sides of the bus bar with one segment offset with respect to the other segment along the length of the bar, and they are so positioned on the bar in inverted relation that offset portion 21 and end portion 23 of each segment of the connector are in alignment with recesses 24, 19 respectively of the other. That is segment 2 is in an inverted position with respect to segment 3 such that offset portion 21 of segment 3 is in alignment with recess 24 of segment 2 and end portion 23 of segment 2 is in alignment with recess 19 of segment 3. In these positions, surface 20 of segment 3 rests on one side of bus bar 7 and the same surface of segment 2 rests on the other side of the bus bar. One or both segments may now be slid along the bus bar to bring the offset portions into the respective recesses and thereby loosely lock the two segments together around the bus bar. Once the segments are interlocked properly, lead-off conductors 10 and 11 may be inserted into slots 8 and 9, and thereafter set screws 4 and 5 driven into threaded passages 14 and 15 to secure the assembly of bus bar, segments and lead-off conductors. When driven into the block screws 4 and 5 bear against lead-off conductors 10 and 11 respectively and thereby force the conductors against the bus bar and at the same time tightening the screws tends to force the segments away from the sides of the bus bar whereby the interlocking portions or hooks of the segments grip each other firmly. Since the lead-off conductors are in direct contact with the bus bar, good electrical contacts are assured. It is to be noted that any one of the two set screws and the lead-off conductors associated therewith may be omitted without impairing the efficiency of the remaining joint, that is, for example, screw 4 and conductor 10 need not be present for screw 5 to provide an adequate joint between the bus bar and conductor 11. However, two set screws usually will be provided, and in the event that one of the lead-off conductor slots is unused, the set screw associated with the empty slot can be driven home against the bus bar to aid in securing the block.

In another embodiment of the invention shown in FIGURE 5, the novel connector is used to secure two bus bars together. The ends of bus bars 27 and 28 overlap inside slot 26 of connector block 25 and screws 4 and 5 bear against bars 27 and 28 respectively to secure the assembly. When the connector is used in this way, there is no need for lead-off conductor slots, which slots are not shown in the FIGURE 5 illustration.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. An electrical connector comprising a block divided into two discrete and identical interlocking segments, each segment having a body portion integral with interlocking end portions; a first slot through said block for receiving a bus bar, a substantial portion of said first slot bounded by said body portions and said first slot constituting a dividing zone between said segments; second and third substantially parallel slots through said block on opposite sides of said first slot at substantially a right angle thereto, said second and third slots overlapping said first slot inside said block and said second and third slots adapted to receive lead-off conductors for direct connection to said bus bar; a first threaded passage through the body portion of one segment, said first passage passing through said second slot and terminating at said first slot; a second threaded passage through the body portion of the other segment, said second passage passing through said third slot and terminating at said first slot; a set screw threaded into each passage and adapted to bear against lead-off conductors in said second and third slots for forcing them against a bus bar extending through said first slot when said screws are driven into said passages, thereby forcing said segments into firm interlocking relation and securing together an assembly of segments, conductors and bus bars.

2. An electrical connector comprising a block divided into two discrete interlocking segments having identical external contours; each segment having a body portion integral with interlocking end portions and a planar surface extending between said end portions; said segments being assembled with the corresponding planar surfaces of said body portions in spaced apart relationship to provide a first slot of rectangular cross section through said block for receiving a bus bar; each of said body portions having a first extension projecting from one side thereof in a direction to define a continuation of said surface; said first extension terminating in a portion offset in a direction pointing away from said surface; said body portion, said first extension and said first offset portion defining a recess; a second extension of said body portion on the other side thereof pointing in a general direction opposite to the direction in which said offset portion projects, said second extension defining a further continuation of said surface and terminating in a hooked portion having the end thereof pointing toward said body portion and said hooked portion defining a second recess; when assembled to form said block said segments being in inverted relationship such that said offset and end portions of one segment engage within said second and first recesses respectively of the other segment to interlock said segments; second and third substantially parallel slots through said block on opposite sides of said first slot overlapping and communicating with said first slot inside said block; and said second and third slots adapted to receive lead-off conductors for direct connection to the bus bar and each of said sections including a threaded passage extending from said surface to the opposite surface of said body, and a set screw threaded into each said passage for applying pressure to a corresponding one of the lead-off conductors thereby forcing said segments into firm interlocking relation and securing together an assembly of segments, conductors and bus bar.

References Cited by the Examiner

UNITED STATES PATENTS

| | | | |
|---|---|---|---|
| 557,518 | 3/96 | Pfluger | 339—272 |
| 1,916,488 | 7/33 | Parrish | 339—272 |
| 2,196,383 | 4/40 | Buchanan. | |
| 2,574,781 | 11/51 | Greene et al. | 339—244 X |
| 2,900,688 | 8/59 | Hicks | 339—272 X |
| 2,938,191 | 5/60 | Kobryner et al. | 339—272 |

FOREIGN PATENTS

| | | |
|---|---|---|
| 603,254 | 8/60 | Canada. |
| 565,745 | 12/32 | Germany. |
| 177,271 | 3/22 | Great Britain. |

JOSEPH D. SEERS, *Primary Examiner.*